United States Patent [19]

Pfannmueller et al.

[11] 3,714,135
[45] Jan. 30, 1973

[54] PRODUCTION OF HOMOPOLYMERS OR COPOLYMERS OF ETHYLENE

[75] Inventors: Helmut Pfannmueller; Friedrich Urban, both of 6700 Limburgerhof; Hans Gropper; Volker Gierth, both of 6703 Ludwigshafen, all of Germany

[73] Assignee: Badische Anilin- & Soda-Fabrik Aktiengesellschaft, Ludwigshafen am Rhine, Germany

[22] Filed: Sept. 16, 1970

[21] Appl. No.: 72,866

[52] U.S. Cl. ............ 260/86.7, 260/63 R, 260/73 R, 260/78.5 HC, 260/88.1, 260/94.9 R
[51] Int. Cl. .......................... C08f 1/60, C08f 15/02
[58] Field of Search ........... 260/94.9 R, 86.7, 85.3 R, 88.1 R

[56] References Cited

UNITED STATES PATENTS 3,142,666 7/1964 Deex et al. .................... 260/94.9 R

FOREIGN PATENTS OR APPLICATIONS 1,008,115 10/1965 Great Britain .................. 260/94.9 R
1,047,851 11/1966 Great Britain .................. 260/94.9 R

OTHER PUBLICATIONS

Kirk–Othmer, Encyclopedia of Chemical Technology, Vol. 14, pg. 811–813, Interscience (1963) TP 9 E68
Encyclopedia of Polymer Science and Technology Vol. 9, pg. 818–827, Interscience TP 156.P6E6

Primary Examiner—James A. Seidleck
Assistant Examiner—A. Holler
Attorney—Johnston, Root, O'Keeffe, Keil, Thompson and Shurtleff

[57] ABSTRACT

Production of homopolymers or copolymers of ethylene by homopolymerization of ethylene or copolymerization of mixtures of ethylene and other monomers at superatmospheric pressure and elevated temperature under the influence of a free radical generating polymerization initiator with or without a polymerization regulator. The initiator used is a mixture of (a) an initiator having a halflife of ten to 30 hours at 50°C and (b) an initiator having a halflife of 0.2 to 10 hours at 50°C, the halflife at 50°C of initiator (a) being at least twice as long as that of initiator (b). Polymers having a high molecular weight and a low degree of branching are obtained in a fairly high yield.

7 Claims, No Drawings

PRODUCTION OF HOMOPOLYMERS OR COPOLYMERS OF ETHYLENE

The present invention relates to a process for the production of homopolymers or copolymers of ethylene by homopolymerization of ethylene or by copolymerization of a mixture of 100 molar proportions of ethylene and up to 100 molar proportions of one or more other monomers which are copolymerizable with ethylene, which have from three to twenty carbon atoms and which are ethylenically unsaturated, at a pressure of from 800 to 7,000 atmospheres and at a temperature of from 150° to 260° C under the influence of a free radical generating polymerization initiator with or without a polymerization regulator.

In prior art methods of this type there is a general rule that (under otherwise identical conditions) relatively small yields are obtained at relatively low temperatures and relatively large yields at relatively high temperatures. There is also the rule that (under otherwise identical conditions) polymers having a relatively high molecular weight and a relatively low degree of branching are obtained at relatively low temperatures, while polymers having a relatively low molecular weight and a relatively high degree of branching are obtained at relatively high temperatures. As a result, low yields have to be taken into account if polymers are desired which have a relatively high molecular weight as well as a relatively low degree of branching. Such polymers are however of commercial importance because they are distinguished by comparatively high yield points and low elongation (particularly homopolymers) and a low melt index (particularly copolymers with a relatively high content of comonomers).

The present invention has for its object to provide a process of the type defined above with which it is possible to prepare polymers having a high molecular weight and a low degree of branching in higher yields.

We have found that this object is achieved by using as polymerization initiator a mixture of two special types of free radical generating polymerization initiators.

In accordance with this invention the process involves the production of homopolymers or copolymers of ethylene by homopolymerization of ethylene or by copolymerization of a mixture of 100 molar proportions of ethylene with up to 100 molar proportions of another ethylenically unsaturated monomer containing three to 20 carbon atoms which is copolymerizable with ethylene at a pressure of 800 to 7,000 atmospheres and temperatures of from 150° to 260° C, preferably from 165° to 235° C under the action of a free radical generating polymerization initiator with or without a polymerization regulator. The polymerization initiator to be used according to the invention in an amount of from 2 to 1,000, preferably from 3 to 200, ppm molar (based on the total amount of monomers used) consists of a mixture of a. a free radical generating polymerization initiator which has a halflife of from 10 to 30 hours at 50° C; and b. a free radical generating initiator which has a halflife at 50° C of from 12 minutes to 10 hours, with the provisos that I. the halflife at 50° C of the polymerization initiator (a) is at least twice as long as that of polymerization initiator (b); and II. the amount of either of the polymerization initiators (a) and (b) is at least 10 percent molar and preferably at least 25 percent molar based on the total molecular amount of the mixture.

The following may be said concerning the two special types of free radical generating polymerization initiators to be used according to the invention:

a. examples of free radical generating polymerization initiators having a halflife at 50° C (HL/50° C) of 10 to 30 hours which are suitable are bis-2,4-dichlorobenzoyl peroxide (HL/50° C = 18 hours), tert-butyl perpivalate (HL/50° C = 20 hours) and 2,2'-azobis-(2,4-dimethylvaleronitrile) (HL/50° C = 28 hours). Instead of individual initiators, a mixture of two or more such polymerization initiators may be used;

b. examples of suitable free radical generating polymerization initiators having a halflife at 50° C (HL/50° C) of from 12 minutes to 10 hours are acetylcyclohexanesulfonyl peroxide (HL/50° C = 24 minutes), bis-(4-tert-butylcyclohexyl) peroxydicarbonate (HL/50° C = 2 hours, 36 minutes) and diisopropyl peroxydicarbonate (HL/50° C = 6 hours). Instead of an individual polymerization initiator, a mixture of two or more such polymerization initiators may be used.

It has been found that mixtures of:

(a) tert-butyl perpivalate and (b) bis-(4-tert-butylcyclohexyl) peroxydicarbonate; and of a. 2,2'-azobis-(2,4-dimethylvaleronitrile) and b. bis-(4-tert-butylcyclohexyl) peroxydicarbonate are extremely well suited.

Suitable equipment and procedures for carrying out the process according to the invention are those conventionally used for the polymerization of ethylene at superatmospheric pressure and elevated temperature. Instead of giving further details, reference is made to "Ullmanns Enzyklopadie der technischen Chemie," volume 14, third edition (Munich-Berlin 1963) chapter on polyethylene, pages 137 to 148, or to Lyle F. Albright, "High-Pressure Processes for Polymerizing Ethylene," Chemical Engineering, volume 73 (1966) issue of December 19, pages 113 to 120.

Comonomers for ethylene in the copolymerization are those conventionally used (within the above definition), particularly those which have monoethylenic unsaturation. Examples of suitable comonomers are vinyl esters, particularly of $C_1$ to $C_6$ alkanecarboxylic acids; esters of acrylic and methacrylic acid, particularly with $C_1$ to $C_8$ alkanols; esters of monoethylenically unsaturated dicarboxylic acids, particularly monoesters and diesters of maleic and fumaric acids with $C_1$ to $C_8$ alkanols; monoethylenically unsaturated carboxylic acids, particularly acrylic, methacrylic, maleic and fumaric acids; amides of monoethylenically unsaturated carboxylic acids, particularly acrylamide, methacrylamide and N-monoalkylamides and N,N-dialkylamides (with $C_1$ to $C_8$ alkyl groups) of acrylic and methacrylic acids; vinyl ethers, particularly vinyl ethers of $C_1$ to $C_8$ alkanols, of phenol or a naphthol; monoethylenically unsaturated alcohols, particularly $C_3$ to $C_8$ alkenols; monoethylenically unsaturated aldehydes, particularly $C_3$ to $C_8$ alkenals; monoethylenically unsaturated ketones, particularly $C_4$ to $C_9$ alkenones. The comonomers may be used as individuals or as mixtures of different individuals in the copolymerization. For the sake of completeness it may also be stated that a number of the said comonomers act (in known manner) as polymerization regulators.

It the process according to the invention, as already stated, polymerization regulators may be present. The amount of regulator, as is well known, may vary so greatly according to the strength of the regulator and the other process conditions that it is impossible to give generally applicable statements regarding absolute values. In the context of regulators, reference may be made to G.A. Mortimer, J. Polym. Sci., Part A–1, 4 (1966), No. 4, pages 881 to 900.

As polymerization apparatus a tubular reactor is used such as is conventionally used in continuous high-pressure polymerization of ethylene. The ratio of the diameter to the length of the tube is 1:14,000. The tube is surrounded by a jacket tube for reception of a heat transfer medium. The jacket tube itself is subdivided into two zones operable independently of one another, the first extending along two-fifths of the length of the tube (zone I) and the second along the remaining three-fifths (zone II). At the end of the reaction tube there is a valve which serves (a) to control the pressure in the polymerization chamber and (b) to discharge the reaction product. Following this valve there are a conventional high pressure separator and a conventional low pressure separator for separating the polymer obtained from unpolymerized substances, i.e., mainly from the portion of the monomers which have not been involved in the polymerization.

EXAMPLE 1

The reactor is fed at the inlet end with a mixture, compressed to 1,800 atmospheres, consisting of 1,000,000 parts by weight per hour of ethylene, 55 ppm molar per hour (based on the ethylene) of a mixture of 35 ppm molar per hour of tert-butyl perpivalate and 20 ppm molar per hour of bis-(4-tert-butylcyclohexyl) peroxy-dicarbonate in one-twentieth molar acetone solution and also 2,400 parts by weight per hour or methyl ketone (regulator). The heat transfer medium in zone (I) of the jacket is kept at a constant temperature of 165° C, and in zone (II) at 180° C; the reaction material thus reaches a temperature of 230° C by the heat of reaction liberated.

150,000 parts by weight per hour of polyethylene is obtained per hour in this way. Its physical data are: melt index (according to ASTM D 1238) = 4.0 g/10 minutes; density (according to DIN 53,479/7.2) = 0.9352 g/ccm; elongation at break = 150 percent; resistance to tearing = 107 kg/cm².

Comparative Experiment A

The procedure described in Example 1 is followed exactly with the exception that 55 ppm molar per hour of tert-butyl perpivalate alone is used instead of the initiator mixture. In this way only 85,000 parts by weight per hour of polymer is obtained.

Comparative Experiment B

The procedure described in Example 1 is followed exactly with the only exception that 55 ppm per hour of bis-(4-tert-butylcyclohexyl) peroxy-dicarbonate alone is used instead of the initiator mixture. In this way only 120,000 parts by weight per hour of polymer is obtained.

EXAMPLE 2

The reactor is fed at the inlet end with a mixture, compressed to 2,300 atmospheres, consisting of 970,000 parts by weight per hour of ethylene, 30,000 parts by weight per hour of methyl methacrylate, 38 ppm molar per hour (with reference to the whole amount of monomers used) of a one-twentieth molar acetone solution of a mixture of 15.7 ppm molar per hour of 2,2'-azobis-(2,4-dimethylvaleronitrile) and 22.3 ppm molar per hour of bis-(4-tert-butylcyclohexyl) perpxydocarbonate and 3,400 parts by weight per hour of methyl ethyl ketone (regulator). The heat transfer medium is kept at a constant temperature of 165° C in zone (I) of the jacket and at 180° C in zone (II). The reaction material reaches a temperature of 220° C by the heat of reaction.

In this way 165,000 parts by weight per hour of a copolymer is obtained. Its physical data are: units of methyl methacrylate in the polymer: 14.0percent by weight (based on the weight of polymer); melt index (ASTM D 1238) = 4.1 g/10 minutes; density (DIN 53,479/7.2) = 0.9331 g/ccm; elongation at break = 630; tear resistance = 156 kg/cm².

Comparative Experiment A

The exact procedure of Example 2 is followed with the only exception that 38 ppm molar per hour of 2,2'-azobis-(2,4-dimethylvaleronitrile) alone is used instead of the initiator mixture. Only 130,000 parts by weight per hour of polymer is obtained in this way.

Comparative Experiment B

The exact procedure of Example 2 is followed with the only exception that 38 ppm molar per hour of bis-(4-tert-butylcyclohexyl) peroxydicarbonate alone is used instead of the initiator mixture. Only 135,000 parts by weight per hour of polymer is obtained in this way.

EXAMPLE 3

The reactor is fed at the inlet end with a mixture, compressed to 2,100 atmospheres, consisting of 730,000 parts by weight per hour of ethylene, 270,000 parts by weight per hour of vinyl acetate and 6.1 ppm molar per hour (with reference to the whole amount of monomers used) of a one-twentieth molar acetone solution of a mixture of 4.1 ppm molar per hour of tert-butyl perpivalate and 2.0 ppm molar per hour of bis-(4-tert-butylcyclohexyl) peroxydicarbonate. The heat transfer medium is kept at a constant temperature of 165° C in zone (I) of the jacket and at 180° C in zone (II). The reaction material reaches a maximum temperature of 195° C by the heat of reaction.

170,000 parts by weight per hour of a copolymer is obtained in this way. Its physical data are: units of vinyl acetate in the polymer: 24.8 percent by weight (based on the weight of polymer); melt index (ASTM D 1238) = 3.7 g/10 minutes; density (DIN 53,479/7.2) = 0.9503 g/ccm; elongation at break = 730 percent tear resistance = 248 kg/cm².

Comparative Experiment A

The exact procedure of Example 3 is followed with the sole exception that 6.1 ppm molar per hour of tert-butyl perpivalate alone is used instead of the initiator mixture. Only 137,000 parts by weight per hour of polymer is obtained in this way.

Comparative Experiment B

The procedure of Example 3 is followed exactly with the one exception that 6.1 ppm molar per hour of bis-(4-tert-butylcyclohexyl) peroxydicarbonate is used instead of the initiator mixture. Only 145,000 parts by weight of polymer is obtained in this way per hour.

We claim:

1. A process for the production of a homopolymer or copolymer of ethylene by homopolymerization of ethylene or by copolymerization of a mixture of 100 molar proportions of ethylene and up to 100 molar proportions of at least one other ethylenically unsaturated monomer which has from three to twenty carbon atoms and which is copolymerizable with ethylene at a pressure of from 800 to 7,000 atmospheres and a temperature of from 150° to 260° C under the influence of a free radical generating polymerization initiator and with or without a polymerization regulator, wherein there is used as the polymerization initiator in an amount of from 2 to 1,000 ppm molar (with reference to the whole amount of monomers used) a mixture of a. a free radical generating polymerization initiator which has a halflife of from 10 to 30 hours at 50° C and b. a free radical generating polymerization initiator which has a halflife of from 12 minutes to 10 hours at 50° C, with the provisos that
   I. the halflife of the polymerization initiator (a) at 50° C is at least twice that of the polymerization initiator (b) and
   II. the amount of (a) or (b) in the mixture of polymerization initiators is not less than 10 percent molar in either case (with reference to the total molecular amount of the mixture).

2. A process as claimed in claim 1 carried out at from 165° to 235° C.

3. A process as claimed in claim 1 wherein the amount of initiator used is from 3 to 200 ppm molar based on the total amount of monomers used.

4. A process as claimed in claim 1 wherein the amount of each of the polymerization initiators in the mixture of (a) and (b) is at least 25 percent molar based on the total molecular amount of the mixture.

5. A process as claimed in claim 1 wherein initiator (a) is bis-2,4-dichlorobenzoyl peroxide, tert-butyl perpivalate or 2,2'-azobis-(2,4-dimethylvaleronitrile).

6. A process as claimed in claim 1 wherein initiator (b) is acetylcyclohexanesulfonyl peroxide, bis-(4-tert-butylcyclohexyl) peroxydicarbonate or diisopropyl aeroxydicarbonate.

7. A process as claimed in claim 1 wherein initiator (a) is tert-butyl perpivalate or 2,2'-azobis-(2,4-dimethylvaleronitrile) and initiator (b) is bis-(4-tert-butylcyclohexyl) peroxydicarbonate.

* * * * *